United States Patent
Stenzel et al.

(10) Patent No.: US 6,402,042 B1
(45) Date of Patent: Jun. 11, 2002

(54) UNIFORM TEMPERATURE CONTROL SYSTEM

(75) Inventors: Jerry A. Stenzel; Thomas K. Hiniker, both of Mankato; Michael W. Lundgreen, Fairmont; Mark H. Jaeger, Mapleton; Thomas C. Schlosser, North Mankato, all of MN (US)

(73) Assignee: Blue Earth Research, Mankato, MN (US)

( * ) Notice: Subject to any disclaimer, the term of this patent is extended or adjusted under 35 U.S.C. 154(b) by 0 days.

(21) Appl. No.: 09/725,152

(22) Filed: Nov. 29, 2000

(51) Int. Cl.[7] .......................... G05B 11/01; G05D 15/00
(52) U.S. Cl. ..................... 236/33; 236/78 D; 165/286; 700/8
(58) Field of Search ................. 700/8; 236/1 A, 236/20 R, 32, 33, 78 D; 165/286

(56) References Cited

U.S. PATENT DOCUMENTS

| | | | |
|---|---|---|---|
| 2,843,147 A | 7/1958 | Penther | 137/487.5 |
| 3,822,039 A | 7/1974 | Mori et al. | 236/75 |
| 3,860,169 A | 1/1975 | Norman | 251/11 X |
| 4,702,306 A * | 10/1987 | Herzog | 236/24 |
| 4,706,703 A | 11/1987 | Takeuchi et al. | 137/487.5 |
| 4,766,921 A | 8/1988 | Williams | 251/129.05 X |
| 4,974,622 A | 12/1990 | Rader | 251/129.05 X |
| 5,038,821 A | 8/1991 | Maget | 137/486 |
| 5,609,136 A | 3/1997 | Tuken | 123/357 |
| 5,697,436 A * | 12/1997 | Johnson et al. | 165/254 |
| 5,749,327 A * | 5/1998 | Kim | 236/20 R |
| 5,803,057 A | 9/1998 | Van de Brink | 123/527 |
| 6,003,543 A | 12/1999 | Sulatisky et al. | 137/487.5 |
| 6,098,473 A | 8/2000 | Hafner | 73/865.8 |
| 6,240,324 B1 * | 5/2001 | Preska et al. | 700/8 |

* cited by examiner

Primary Examiner—William Wayner
(74) Attorney, Agent, or Firm—Troxell Law Office PLLC

(57) ABSTRACT

The present invention relates to a control system for establishing and maintaining a desired uniform temperature in a room heated by a heating device. The control system includes a valve assembly for controlling the pressure of the fluid supplied to the heating device, the valve assembly including a valve actuator, a pressure sensor sensing the pressure of the fluid supplied to the heater, and a temperature control device to sense the ambient temperature of the room. The control system also includes an electronic control unit connected to the aforementioned elements, the electronic control unit including an electronic circuit which samples "open" and "close" input signals from the temperature control device, determines the rate of change of the pressure of the fluid from a predetermined pressure set point, and varies the pressure set point (which thereby varies the heating device output), according to the "open" or "close" signals by providing a command signal to the valve actuator. This command signal is based upon a difference between the predetermined desired temperature and the actual temperature, and the rate of change of the pressure of the fluid.

9 Claims, 10 Drawing Sheets

UNIFORM TEMPERATURE CONTROL SYSTEM

BACKGROUND OF THE INVENTION

The present invention relates to a control system for establishing and maintaining a desired uniform temperature within an enclosure, more particularly to such a control system which controls the supply of fluid to a heater in order to maintain a substantially uniform temperature.

Temperature control systems are, of course, well known and typically include a device for selecting a desired temperature, such as a thermostat, a device for sensing the actual temperature, and a mechanism for activating and deactivating a heating device. Such known systems will activate one or more heating devices when the actual temperature is below the desired temperature and will deactivate one or more heating devices when the actual temperature rises above the desired temperature. In order to prevent excessive on/off cycling of the heating devices, the known temperature control systems will typically establish on and off set points located below and above the desired temperature. While such known systems eliminate excessive on/off cycling of the heating device, they inherently result in a fluctuation of the actual ambient temperature between the on and off set points.

FIG. 1A illustrates the temperature variation over time for such known systems. As can be seen, the actual ambient temperature varies between the ON set point and the OFF set point and fluctuates above and below the desired temperature. The output of the heating device versus time for the known system is graphically illustrated in FIG. 1B. The output varies cyclically between 0% and 100% in response to input signals from the thermostat.

This temperature fluctuation not only results in discomfort, but in certain circumstances, is highly undesirable. Specifically, in the livestock and poultry industries, excessive variations in the temperature within the animal and fowl enclosures have been found to have adverse affects on the growth of the animals and fowl by affecting the food intake, and inducing animal and fowl stresses. Many experimental research facilities require the maintenance of a uniform temperature to minimize the effects of temperature variations on their ongoing research. Even in typical household or office environments, excessive temperature variations results in discomfort and detracts from the enjoyment of those surroundings.

Systems are known that include a variable valve to control a fluid being supplied to one or more heating devices with a capillary driven actuator having a manual temperature set point adjustment. Internal fluid in the capillary tube expands or contracts in accordance with the ambient temperature driving the actuator to open or close the variable valve until equilibrium is found that matches the manually set point. This system is limited insofar as the set point can only be manually adjusted and the placement of the temperature sensing capillary tube is limited to within a close vicinity of the capillary driven actuator.

Other systems are known which use an electric motor and a gear drive to move a piston which adjusts a pressure regulator to control the fluid to the one or more heating devices. Although this system can be remotely controlled, or manually adjusted, the remote control requires a variable voltage or current input. The variable inputs limit the number of devices to which it can be connected, and the remote control unit must account for the delays in the system from changing the pressure of the fluid supplied to the one or more heating devices to the resultant temperature change. This system also encompasses a number of moving parts which often limit the useful life of the system.

A standard ball valve may be driven by an electric stepper motor to vary the fluid flow to the heating device. However, a system including the valve and stepper motor actuator cannot maintain a steady state pressure within the fluid being supplied to the one or more heating devices when the heating devices are shut off, or when the flames in the one or more heating devices are extinguished.

It is also possible to utilize multiple solenoid valves to select between different pressure regulators in order to regulate the pressure of the fluid being supplied to the one or more heating devices. However, these systems are limited to a step change in the pressure of the fluid and do not provide a continuously variable change in the pressure. This system also requires a number of solenoids and pressure regulators which render the system inherently complex and less reliable than is desired.

SUMMARY OF THE INVENTION

The present invention relates to a control system for establishing and maintaining a desired uniform temperature in a room heated by one or more heating devices. The control system includes a valve assembly for controlling the pressure of the fluid supplied to the heating device, the valve assembly including a valve actuator, a pressure sensor sensing the pressure of the fluid supplied to the heater, and a temperature control device, such as a thermostat, or electronic temperature controller to sense the ambient temperature of the room and to compare the sensed ambient temperature to a predetermined desired temperature. The control system also includes an electronic control unit connected to the aforementioned elements, the electronic control unit including an electronic circuit which receives a signal from the temperature control device, determines the rate of change of the pressure of the fluid from a predetermined pressure set point, and varies the pressure set point (which thereby varies the heating device output), by providing a command signal to the valve actuator based upon an "open" or "close" signal from the temperature control device. Thus, the command signal from the electronic control unit is indicative of the difference between the predetermined desired temperature and the actual temperature, and the rate of change of the pressure of the fluid. The temperature control device asserts an "open" signal (heat required) if the ambient temperature is below the desired temperature, and asserts a "close" signal if the ambient temperature is above the desired temperature.

The control system according to the present invention limits the frequency at which high and low room temperatures are reached by providing a continuous regulated heat flow that is gradually increased, or gradually decreased as needed to maintain the desired temperature set point.

The valve in the fluid supply line which supplies fluid to the heating device is controlled by a thermal heat motor that is designed to be used as an on/off controller for the valve. The electronic control unit monitors the fluid supply line pressure at predetermined intervals to provide a closed loop algorithm for increasing or decreasing the pressure of the supplied fluid and regulating the power to the heat motor. The heat motor is regulated by a combination of pulse width modulation (PWM) and stepped on/off pulses. A nominal power is applied to the thermal heat motor which maintains the output control in a desired position. When the pressure of the supplied fluid should be increased (temperature control device asserting "open" signal) to increase the output of the heating device, the applied power to the heat motor is doubled for a predetermined amount of time, and the level of the nominal power to the heat motor is incremented by 1 part in 256. When the pressure of the supplied fluid should be decreased (temperature control device asserting "close" signal) in order to decrease the output of the heating device, the applied power to the heat motor is reduced to zero for a predetermined amount of time and the nominal power to the heat motor is decremented by 1 part in 256. Alternatively, there are other methods to implement the electronic control unit. A digital/analog (DIA) connector could provide a control voltage to the heat motor. Also, the resolution need not be exactly 1 part in 256, but may be changed according to the parameters of each particular installation. The nominal power to the heat motor is controlled by the PWM duty cycle, which slowly and automatically compensates for the changes in ambient temperature which affect the heat motor.

The control system according to the present invention utilizes two feedback control loops. One loop controls the pressure of the fluid being supplied to the heating device, and the other loop controls the temperature by adjusting the pressure set point of the fluid pressure control loop. The pressure control loop monitors the pressure at predetermined intervals and, if the pressure of the fluid should be changed, it is changed by incrementing or decrementing the PWM register.

The temperature control loop controls the temperature by adjusting the pressure set point of the pressure control loop. The ambient temperature is monitored at predetermined intervals and, if the temperature is above the temperature set point, a "close" signal is asserted by the temperature control device and the fluid pressure set point is decreased by a predetermined amount. If the ambient temperature is below the temperature set point, an "open" signal is asserted by the temperature control device and the fluid pressure set point is increased by a predetermined amount.

DETAILED DESCRIPTION OF THE PREFERRED EMBODIMENT

The control system according to the present invention finds particular application in maintaining a desired uniform temperature within a room or an enclosure by controlling the pressurized supply of fluid to one or more heating devices located within the room or the enclosure. Although the invention will be described in conjunction with its usage in controlling gas to a gas burning radiant heater in an animal or fowl enclosure, it is to be understood that the principles elucidated herein may be utilized to control the fluid to any type of heating device, such as gas, hot water, steam, etc., located in any type of enclosure The term "heating fluid" used throughout this application will be understood to refer to any type of such fluids used by heating devices.

Figure 1A:
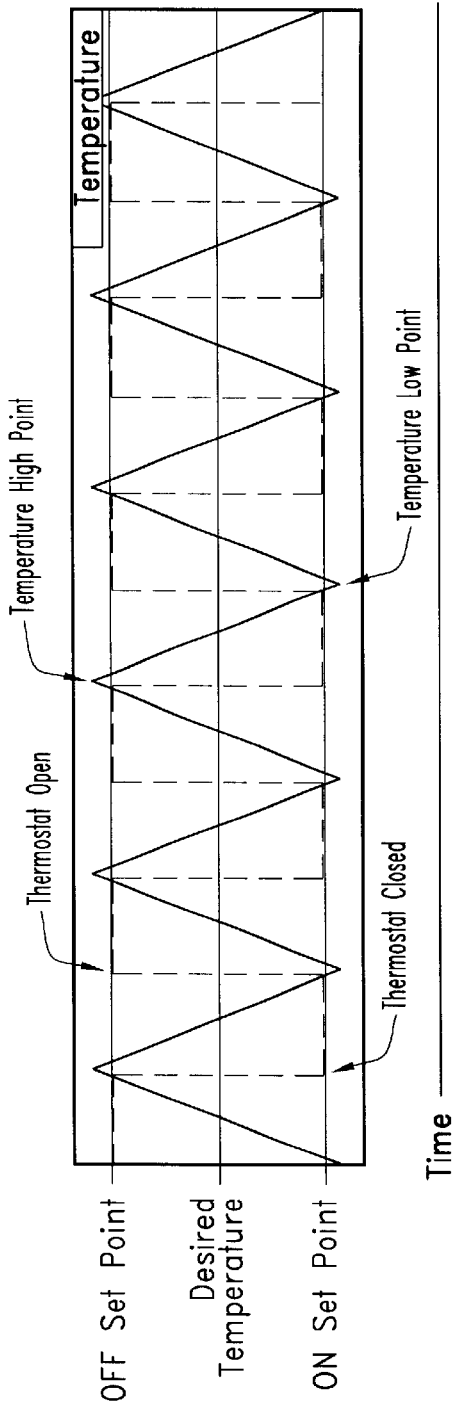
FIG. 1A is a graph of ambient temperature variation versus time for a known temperature control signal.
Figure 1B:
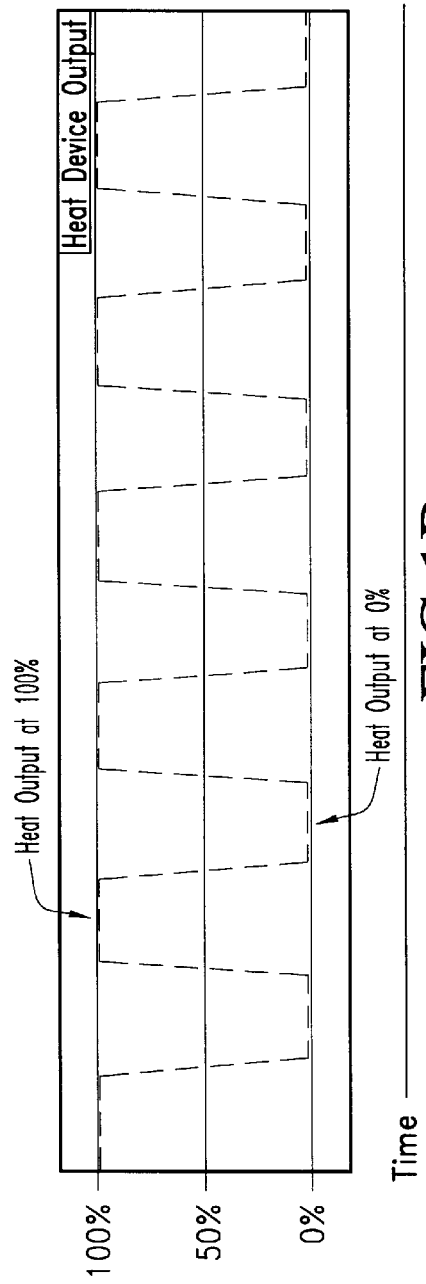
FIG. 1B is a graph of heating device output versus time for the known temperature control system of FIG. 1A.
Figure 2:
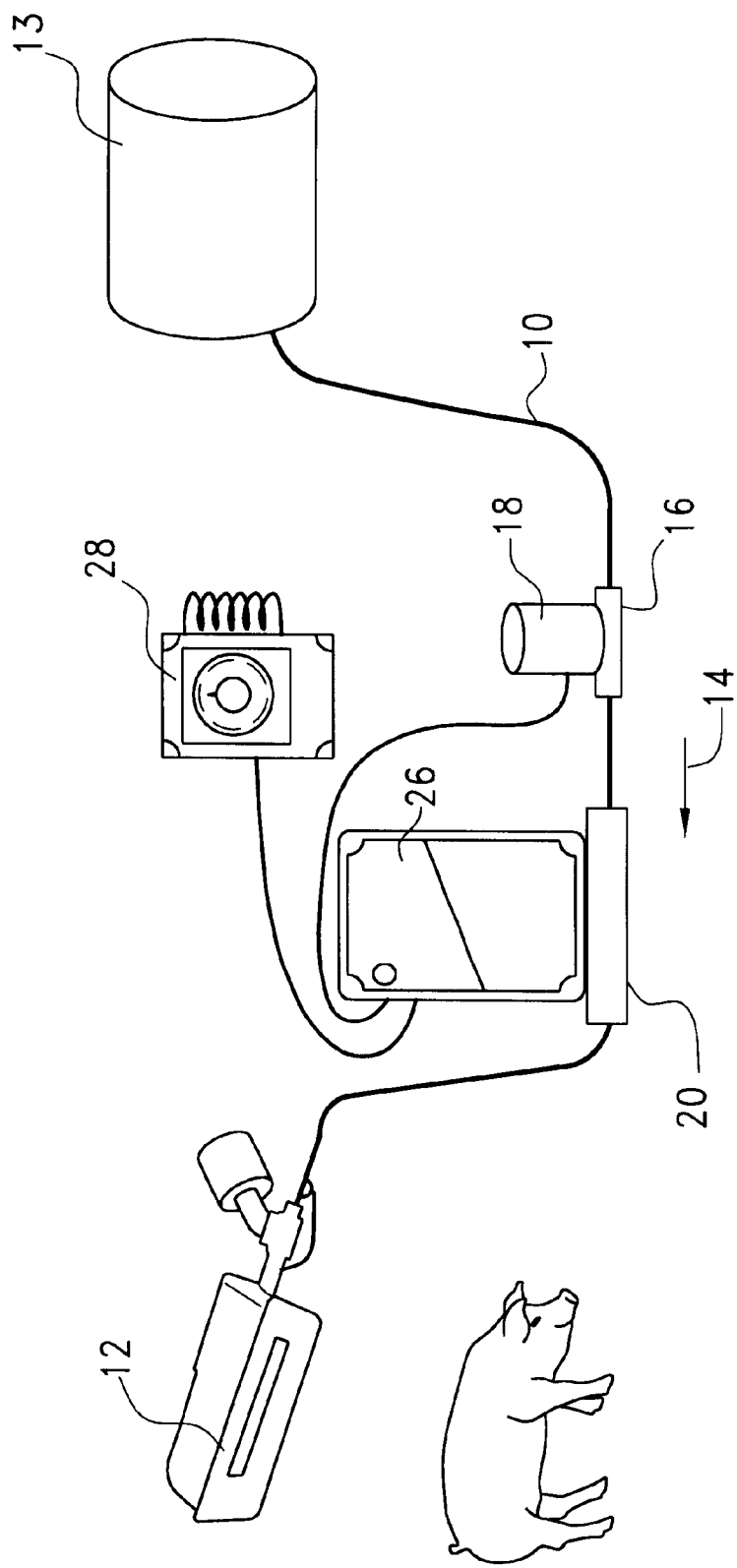
FIG. 2 is a diagrammatical representation of the temperature control system according to the present invention.

As illustrated in FIG. 2, conduit 10 supplies heating fluid to a heating device 12 from a heating fluid source 13 in the direction of arrow 14. A fluid control valve 16 is located in the supply conduit 10 so as to control the pressure of heating fluid to the heating device. The valve 16 may comprise a known valve having a spring biased valve element. The gas valve 16 cooperates with a known thermal heat motor actuator 18. Typically, the known thermal heat motor actuators have a thermal piston actuator with a spring detent connected to the valve element such that the heat motor actuator will hold the valve closed until electrical power is applied to the actuator. The actuator is normally an on/off device and, as electrical power is applied, a resistive component heats a thermal wax-filled tube which causes the wax to melt and expand the tube, thereby moving a piston which is attached to the valve actuator to open the valve 16.

Figure 3:
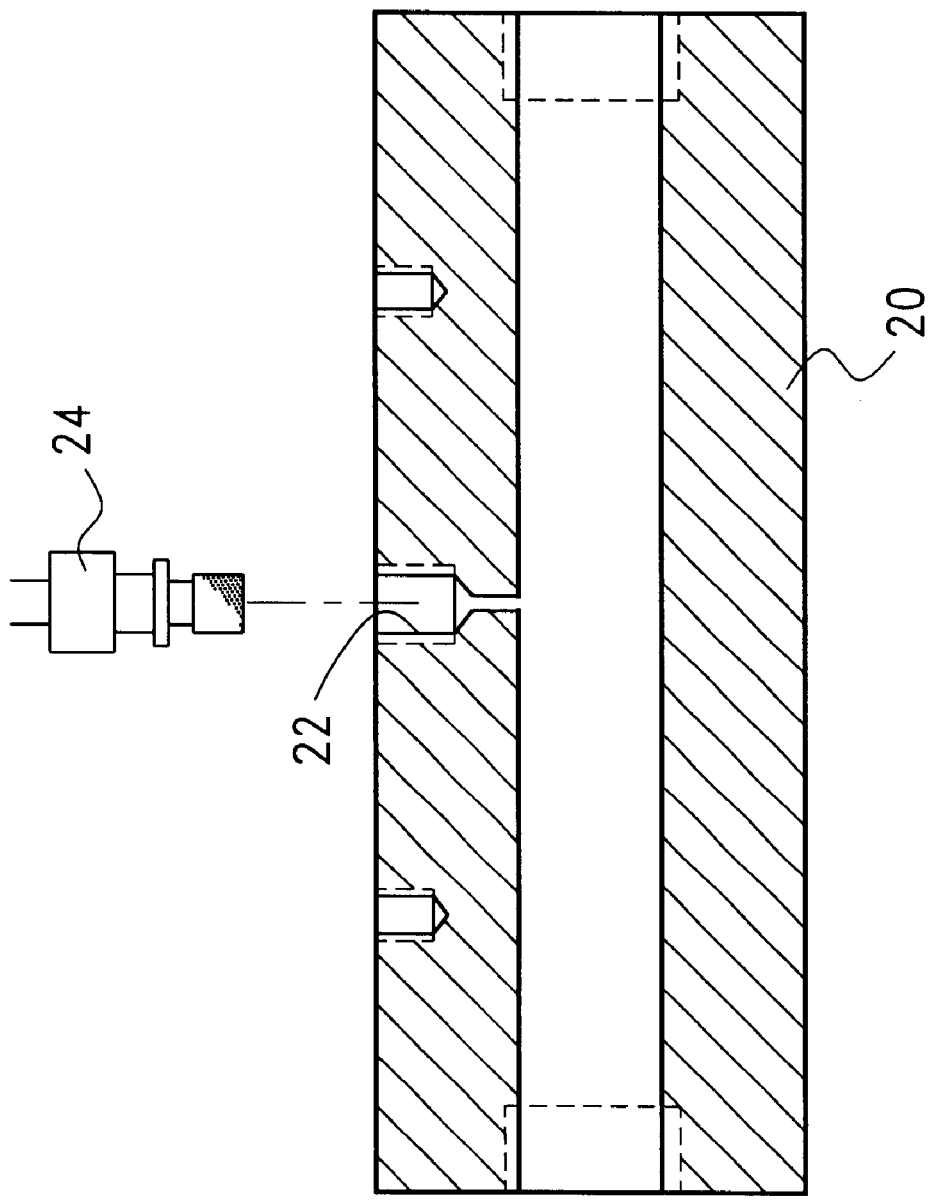
FIG. 3 is an exploded, cross-sectional view illustrating the connection of the pressure sensor to the fluid supply conduit.

A fitting 20 is located in the supply conduit 10 downstream of the fluid valve 16. The fitting 20, which is also illustrated in FIG. 3, has a port 22 into which is inserted a pressure sensor 24. Pressure sensor 24 senses the pressure of the heating fluid within the supply conduit 10 and, as will be explained in more detail hereinafter, is connected to the control circuit of the present invention. The electronic control unit 26 may also be conveniently connected to the fitting 20, although it is to be understood that the control unit 26 may be physically located in more convenient or accessible locations if circumstances warrant. Electronic control unit 26 includes an electronic circuit 30, illustrated in FIG. 11A, which will be described in more detail hereinafter.

The temperature control system of this invention utilizes two feedback control loops to establish and maintain a uniform temperature within the room or the enclosure. One loop controls the pressure of the heating fluid which, in turn, controls the heat output of the heating device, while the other loop adjusts the set point of the fluid pressure control loop depending upon a comparison of the desired temperature with the ambient temperature. The temperature control device 28, which may comprise one or more thermostats, or electronic temperature controller compares the actual temperature in the room, or the enclosure, to a predetermined desired temperature to generate "open", or "close" signals. The electronic control unit determines the pressure and the rate of change of the pressure of the heating fluid from a predetermined pressure set point and varies this pressure set point (which varies the output of the heating device) by receiving the "open", or "close" signals from the temperature control device and issuing a command signal to the valve actuator. The command signal is, thus, based upon a difference between the predetermined temperature set point and the actual temperature, and the rate of change of the pressure of the heating fluid.

The known thermal heat motor actuator 18 is used as an on/off controller for valve 16, in this particular instance a valve controlling the heating fluid. The opening and closing times of the actuator 18 are typically three minutes from the time power is applied or removed. A very small change in applied voltage will drive the heat motor actuator 18 from open to closed. This makes the "gain" of the actuator, PSI per volt, very high. The time delay, the high "gain" and the sensitivity to ambient temperature normally does not enable the heat motor actuator 18 to make precise changes in the valve position in order to precisely control the ambient temperature in a uniform manner. As discussed previously, the known temperature control systems typically provide large variations in temperature.

The present invention overcomes these problems by applying a nominal power to the actuator 18 which maintains the position of the output control at a predetermined desired level. If the temperature control device 28 compares the actual temperature in the room to the predetermined desired temperature and determines that the temperature should be increased, an "open" signal is passed to the electronic control unit 26 which determines that the pressure set point is also to be increased. At this point, the applied power to the heat motor actuator 18 is doubled for a predetermined amount of time, typically 1.0 seconds, and the nominal power applied to the heat motor actuator 18 is incremented by 1 part in 256. Should the temperature control device 28 determine that the temperature should be decreased, a "close" signal is passed to the electronic control unit 26 which reduces the pressure by reducing the power to the heat motor actuator 18 to zero for a predetermined amount of time, typically 1.0 seconds, and the nominal power is decremented by 1 part in 256. The 1.0 second adjustments in the power to the heat motor actuator 18 change the pressure of the heating fluid within a few seconds. The nominal power applied to the heat motor actuator 18 is controlled by a pulse width modulation (PWM) and a stepped on/off pulse which slowly and automatically compensate for the changes in ambient temperature, which may affect the heat motor actuator.

Pressure Control Loop

Figure 4:
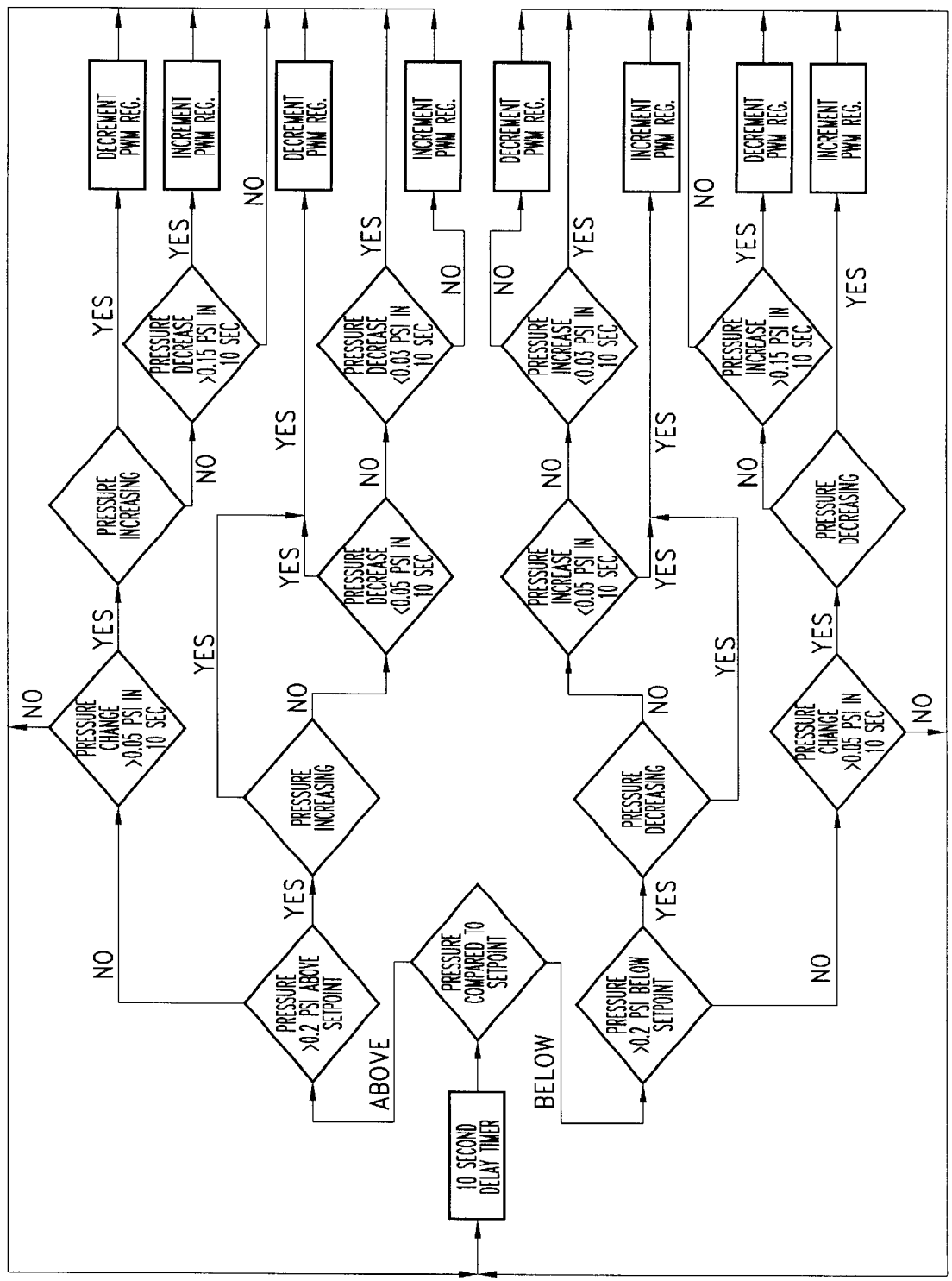
FIG. 4 is a logic diagram for the pressure control loop for one application of the present invention.
Figure 13:
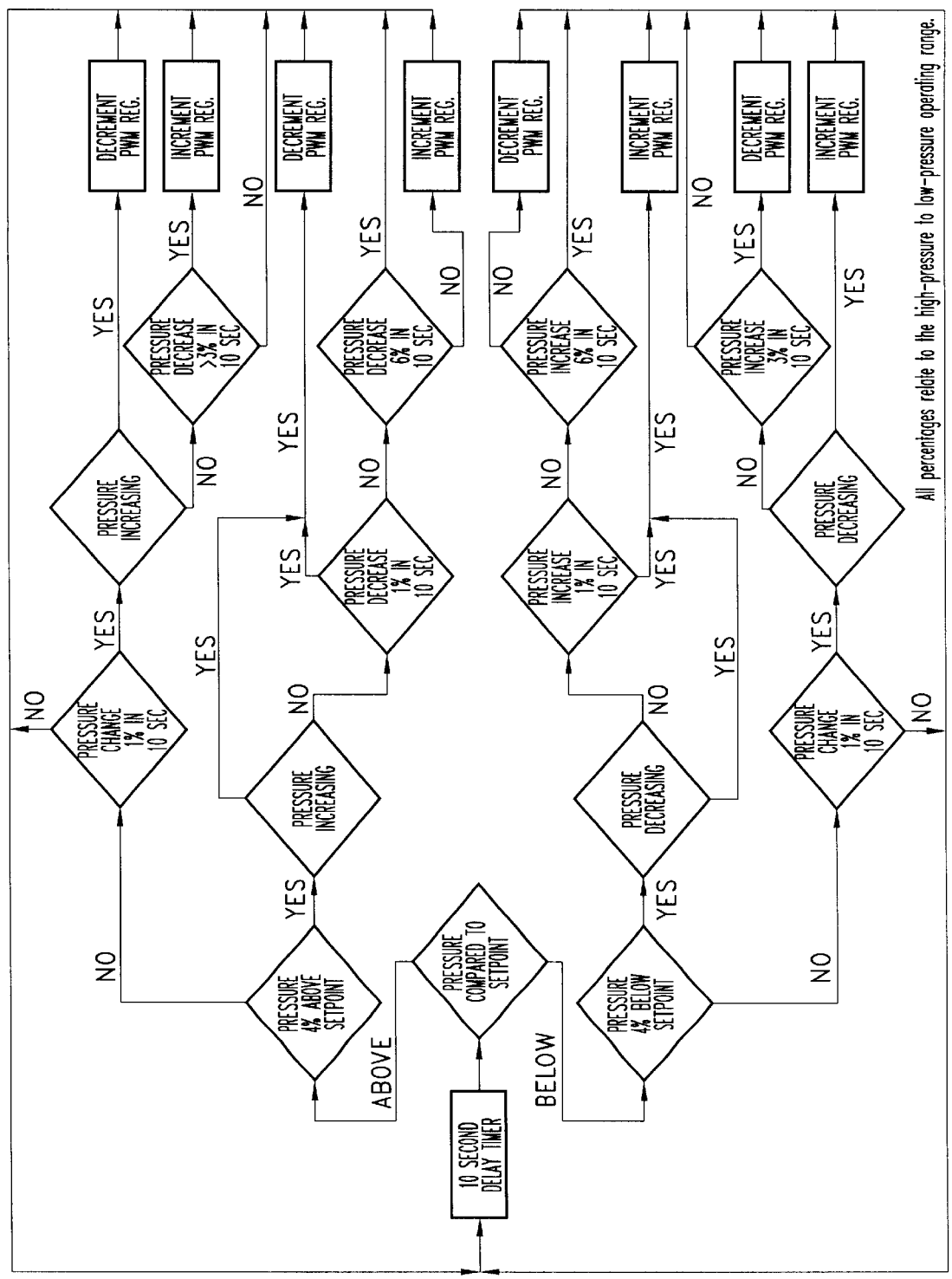
FIG. 13 is a logic diagram for the pressure control loop similar to FIG. 4, but with the pressures and rates expressed as a percentage of the difference between the low and high pressures of any application of the present invention.

The pressure control loop portion of the electronic circuit 30 is illustrated in FIGS. 4 and 13, and monitors the pressure in the conduit 10 at predetermined intervals. These intervals are typically 10 seconds, but may vary depending upon the parameters of each individual application. Alternatively, the control circuit may be programmable to allow the user to select a particular interval. By sensing the pressure at predetermined intervals, the pressure control loop portion of the electronic circuit 30 not only determines the actual pressure of the heating fluid, but also determines the rate of change of the pressure of the heating fluid. If an "open", or "close" signal from the temperature control device 28, to be discussed in more detail hereinafter, indicates that the heating fluid pressure set point should be changed, in order to change the output of the heating device to ensure that the ambient temperature is at the desired level, the PWM register is incremented or decremented depending upon whether the pressure set point should be raised or lowered. If the PWM register is incremented, the PWM output is momentarily switched high for a predetermined amount of time. This predetermined amount of time may also be variable and is typically 1.0 second.

Figure 5:
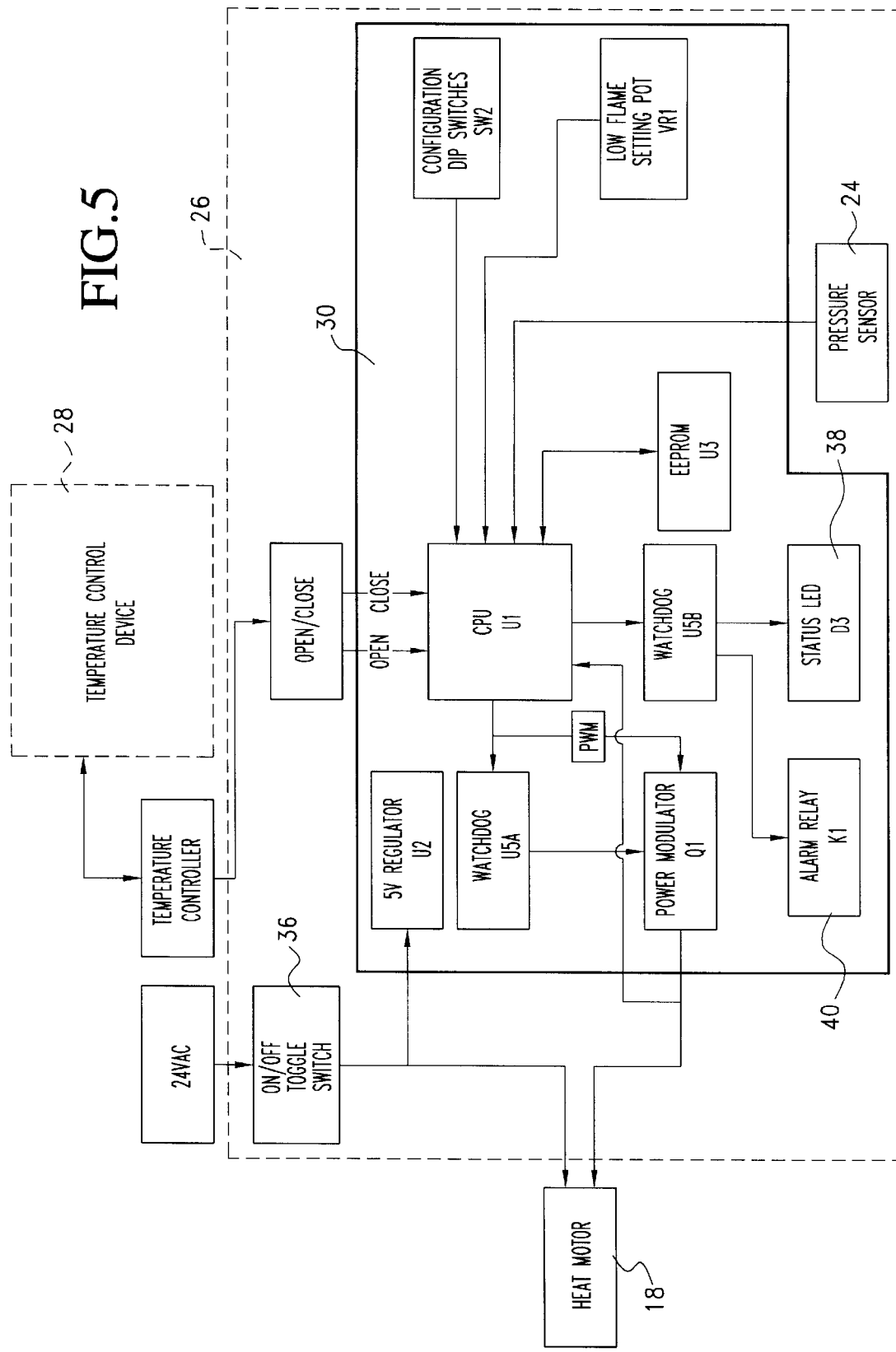
FIG. 5 is a schematic block diagram of the control system of the present invention.
Figure 6:
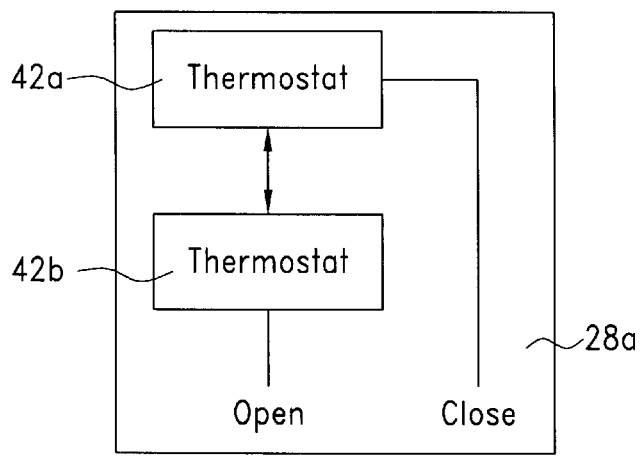
FIG. 6 is a schematic block diagram of a first embodiment of the temperature control device of the present invention.

FIG. 4 illustrates a logic diagram for the electronic control unit 26 and FIG. 5 illustrates a schematic block diagram of the control system of this invention. As can be seen in FIG. 4, which represents one particular application of this invention, if the pressure of the heating fluid is within +/−0.2 PSI of the pressure set point, and the pressure is changing less than 0.05 PSI per 10 seconds, the electronic circuit 30 does not undertake any action. If the pressure is less than 0.2 PSI above the pressure set point, and increasing at more than 0.05 PSI per 10 seconds, the PWM register is decremented to slow and/or stop the pressure from increasing more than 0.2 PSI above the pressure set point. If the pressure is less than 0.2 PSI above the pressure set point and the pressure is decreasing more than 0.15 PSI per 10 seconds, the PWM register is incremented to keep the pressure from falling more than 0.2 PSI below the pressure set point.

If the pressure is less than 0.2 PSI below the pressure set point and decreasing more than 0.05 PSI per 10 seconds, the PWM register is incremented to slow and/or stop the pressure from decreasing to 0.2 PSI below the pressure set point. If the pressure is less than 0.2 PSI below the set point and increasing more than 0.15 PSI per 10 seconds, the PWM register is decremented.

If the pressure is more than 0.2 PSI above the set point and:

the pressure is increasing, the PWM register is decremented;

the pressure is decreasing less than 0.05 PSI per 10 seconds, the PWM register is decremented;

the pressure is decreasing between 0.05–0.30 PSI per 10 seconds, the circuit does not undertake any action; and, the pressure is decreasing more than 0.3 PSI per 10 seconds, the PWM register is incremented.

If the pressure is more than 0.2 PSI below the pressure set point and:

the pressure is decreasing, the PWM register is incremented;

the pressure is increasing less than 0.05 PSI per 10 seconds, the PWM register is incremented;

the pressure is increasing from 0.05 to 0.30 PSI per 10 seconds, the circuit does not undertake any action; and, the pressure is increasing more than 0.3 PSI per 10 seconds, the P.W.M. register is decremented.

Although the pressures, rates and intervals noted above have been found to be effective, it is to be understood that other pressures, rates and intervals may be equally effective depending upon the parameters of each particular application. FIG. 13 illulstrates a logic diagram in which the logic parameters are expressed as a percentage of the difference between the low and high pressure operating range. Thus, as can be seen in FIG. 13, the instant invention is applicable to heating systems operating at various pressure ranges.

Temperature Control Loop

Figure 9:
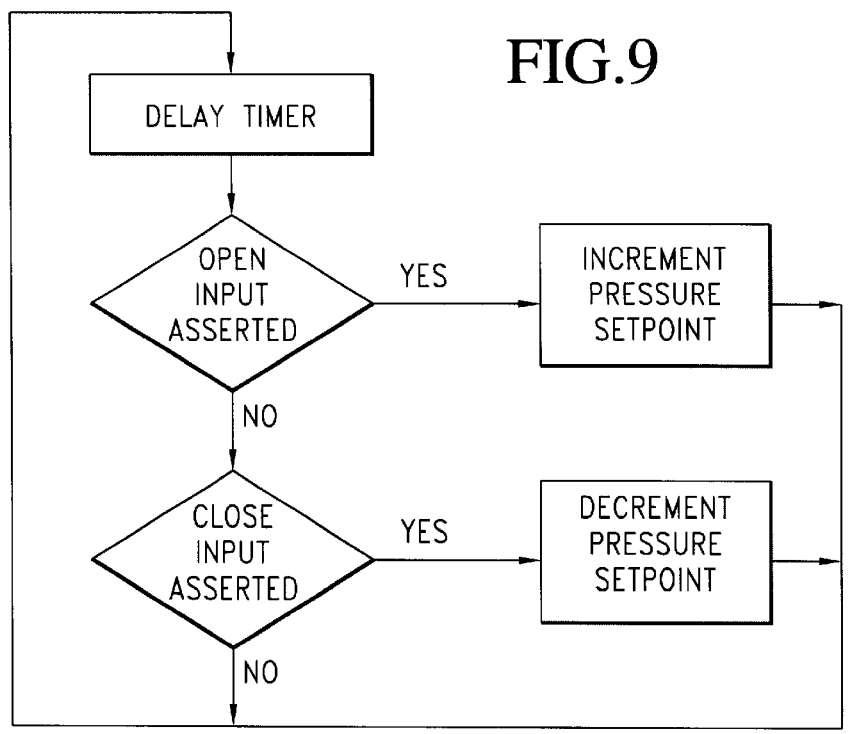
FIG. 9 is a logic diagram for the dual input temperature control loop.
Figure 10:
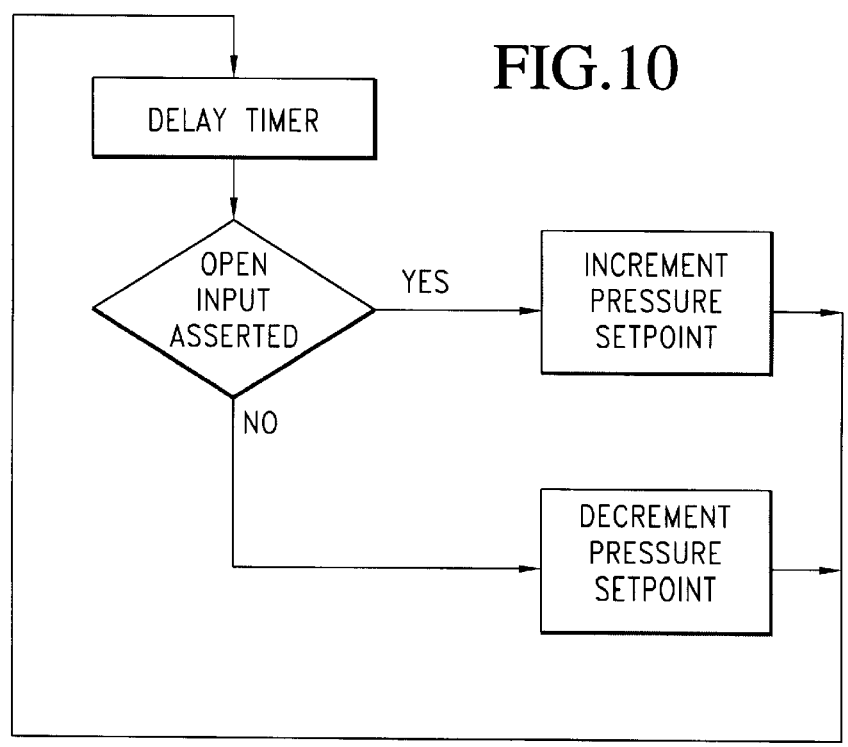
FIG. 10 is a logic diagram for the single input temperature control loop.

The temperature control loop, illustrated in FIGS. 9 and 10, includes a temperature control device 28 (thermostat, or electronic temperature controller) which monitors the ambient temperature of the room or the enclosure at predetermined intervals and provides "open"/"close" signals to the electronic control unit. The intervals are typically every 4 minutes, but may vary depending upon the characteristics of each particular application. The temperature control device 28 provides a signal to the electronic circuit 30 to adjust the pressure set point of the heating fluid which, in turn, controls the heating output of the heating device 12. If the temperature control device 28 senses that the ambient temperature is above the predetermined set point, it will assert the "close" signal, the electronic circuit 30 will detect this signal within its sampling time period and the fluid pressure set point will be decreased by 0.2 PSI. Again, this particular value has been found to be effective, but it is to be understood that other values may be equally effective depending upon the specific application of the control circuit. If the temperature control device 28 senses that the ambient temperature is below the predetermined temperature set point, it will assert the "open" signal, the electronic circuit 30 will detect this signal and the fluid pressure set point will be increased by 0.2 PSI. It is noted that the pressure set point is changed only by 0.2 PSI every interval, if necessary.

The temperature control loop portion may have various embodiments, illustrated in FIGS. 6–10. In the first embodiment, illustrated in FIGS. 6 and 9, the temperature control device 28a has an upper set point and a lower set point thermostats 42a and 42b and either "close" or "open" signals may be asserted. The different temperatures between asserting "close" or "open" signals will, in most circumstances, be rather small such that the system will still provide a substantially uniform control of the ambient temperature. When the ambient temperature is between the temperatures for asserting the "close" or "open" signals, the pressure set point of the pressure control loop remains unchanged.

Figure 7:
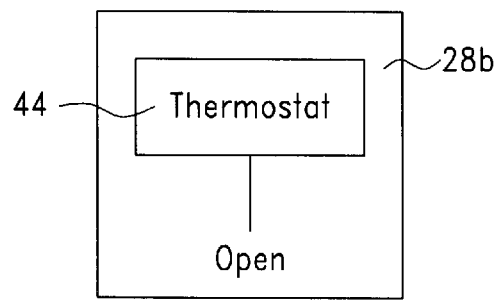
FIG. 7 is a schematic block diagram of a second embodiment of the temperature control device of the present invention.

In FIGS. 7 and 10, a temperature control device 28b is illustrated having a single thermostat 44 such that only the "open" signal is asserted when the ambient temperature is below the temperature set point. In this embodiment, the fluid pressure set point will constantly be increasing or decreasing very slowly to maintain the desired ambient temperature.

Figure 8:
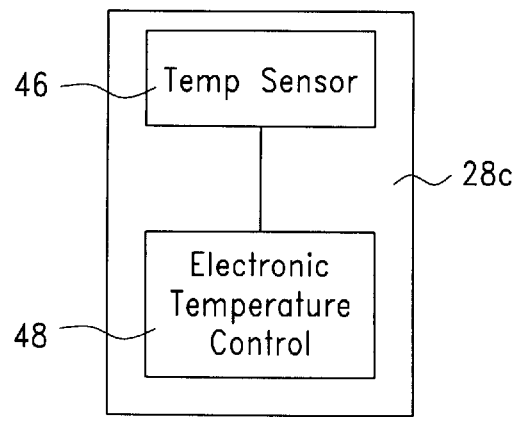
FIG. 8 is a schematic block diagram of a third embodiment of the temperature control device of the present invention.

FIG. 8 illustrates an alternative embodiment wherein the temperature control device 28c includes a temperature sensor 46 and an electronic temperature control 48.

FIG. 5 illustrates a block diagram for the control system of this invention. As can be seen, the pressure sensor 24 is connected to the central processing unit (CPU) U1 of the electronic circuit 30, as is the temperature control device 28 to provide open/close, heat/cool inputs to the CPU U1. The electronic control unit 26 of the present system is provided with an on/off switch 36 which controls the power supply to the system. The electronic control unit 26 may also be provided with a status indication, such as an LED 38, and may also be connected to an alarm (not shown) via alarm relay 40, to provide a visual and/or audible indication should any malfunction occur.

Figures 11A, 11B:
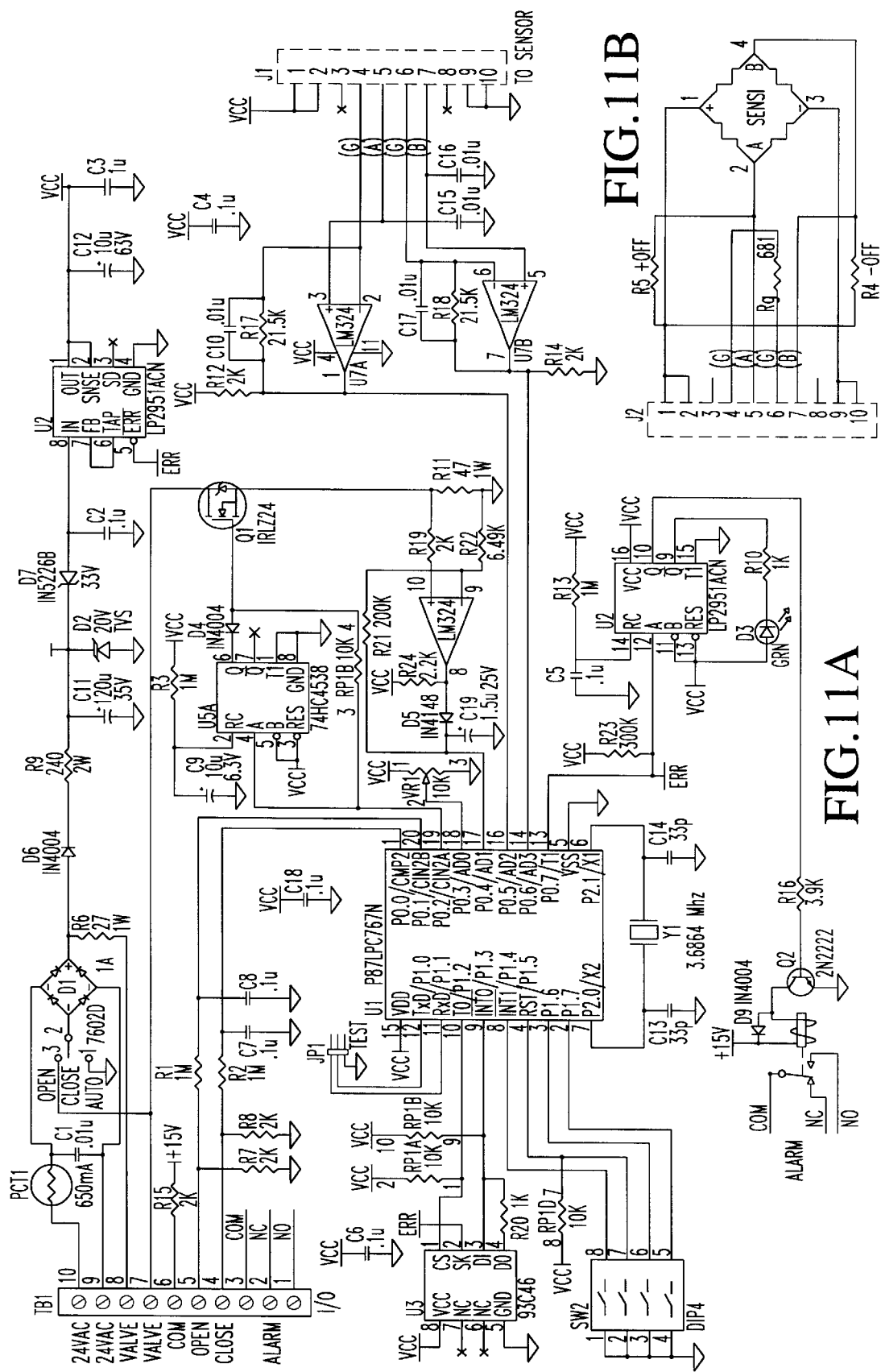
FIG. 11A is a schematic diagram of the electronic circuit for the control system of the present invention.
FIG. 11B is a schematic diagram of the pressure sensor used with the control system of the present invention.

A detailed electrical schematic diagram of the electronic control circuit 30 according to the present invention is illustrated in FIG. 11A. As can be seen, terminals 1 and 2 of terminal block 1 (TB1) are connected to the power supply, in this particular instance such a power supply being 24 volts AC. PTC1 is an electronic fuse that opens when an overcurrent condition develops and automatically resets after the condition has been corrected. SW1 is a three position power switch which, in the AUTO (normal) position provides a return path for logic ground currents back to the negative terminal of the bridge rectifier. The CLOSE position interrupts these currents, removing power from all circuitry and forcing the fluid valve to its normally closed position. The OPEN position provides a means to manually provide full power to the fluid valve in order to force it to its fully open position independent of the CPU U1. This is accomplished by providing a pseudo-ground for the fluid valve through the diode internal to Q1 and R11. Capacitor C1 is an EMI filter capacitor. Bridge rectifier D1 converts the 24 volts AC input to a full-wave rectified voltage having a nominal peak voltage of 33 volts DC. Diode D6 blocks the reverse flow of current through the resistor R9, which would unnecessarily discharge the capacitor C11, increasing the possibility of the voltage applied to voltage regulator U2 dropping below the minimum voltage required to maintain regulation in the output. Resistor R9 is a voltage-dropping resistor to protect the voltage regulator U2 from high input voltages that could result in more power being dissipated in the voltage regulator U2 than it can manage without shutting down. The peak voltage of 33 volts DC of the output is dropped down to approximately +15 volts.

Capacitor C11 is a 120 uF energy storage capacitor that holds up the +15 volts when the AC output transitions between peaks. Diode D2 is a 20-volt transient voltage suppressor (TVS) diode which protects the voltage regulator U2 input from high voltage spikes on the 24 volts AC power input and from transients that might come from the common terminal of terminal 5 of terminal block 1. Capacitor C2 suppresses any high frequency noise present in the input to the voltage regulator U2. Voltage regulator U2 (LP 2951) is configured for a fixed +5 volts DC output. This regulator feeds all of the logic integrated circuits (ICs) and its output is labeled VCC. The ERR output terninal is used to notify the CPU U1 when the VCC drops below approximately 4.75 volts. Capacitor C12 is a 10 uF energy storage capacitor that maintains the stability of the output of the voltage regulator U2. Capacitors C3, C4, C6 and C18 are distributed filter capacitors which suppress voltage spikes caused by transient switching currents of the various electronic components of the system.

Terminals 5, 6 and 7 of terminal block 1 are open/close command inputs connected to contacts of CPU U1. The microcontroller of the CPU U1 supports a single OPEN input command as well as OPEN and CLOSE commands. Resistors R7 and R8 keep the inputs from floating when the open/close input signals are not asserted, while resistor R15 limits the amount of current that can flow out of, or into, the COM terminal (TB1–5) to a safe value.

Resistors R1 and R2, are used in conjunction with capacitors C8 and C7 to filter noise on the open/close signals and limit the current flowing into ports P0.0 and P0.1 to a safe level when the input voltage is above VCC. The circuit may include jack JP1 for testing purposes which is connected to the CPU U1 bi-directional serial port (TxD/RxD).

U5A is a retriggerable monostable multivibrator (74HC4538). When the "A" input transitions from a logic LOW to HIGH, output "Q" will pulse HIGH for approximately 7.5 seconds, as determined by timing components C9 and R3. "Q" will remain HIGH if "A" continues to receive periodic LOW to HIGH transitions prior to the termination of the output pulse. Should the operating program of the CPU U1 become corrupted and not be able to send a periodic pulse to "A", U5A, in conjunction with diode D4, will inhibit the gate drive signal to Q1 that is coupled from the CPU through RP1B. With the gate drive signal removed, Q1 turns off and interrupts the power to the heat motor actuator which, in turn, causes the pressure valve to close.

Q1 is an N channel power MOSFET transistor (IRL530) acting as an electronic switch to control power applied to the pressure valve heat motor actuator. Resistor R6 limits the maximum current to that which can safely be drawn to the heat motor actuator.

Terminals 3 and 4 of terminal block 1 are connected to the pressure valve heat motor actuator 18. A voltage proportional to the current draw of the heat motor actuator is dropped across resistor R11, providing a means for one of the CPU analog inputs to determine the power consumption in the heat motor actuator. The voltage on resistor R11 is coupled to operational amplifier U7C through resistor R19. R19 limits the current into operational amplifier U7C should this voltage exceed VCC. U7C, in conjunction with resistors R21, R22 and RP1C, diode D5 and capacitor C19 form an amplified peak detector circuit. Resistors R21 and R22 determine the amount of amplification that the amplifier U7C will provide. RP1C is a pull-up resistor that assists the amplifier's output in establishing the desired output voltage. As the output voltage of U7C increases, diode D5 provides the means for coupling this increasing voltage to capacitor C19, while blocking decreasing voltages. However, C19 will slowly discharge through the series combination of resistors R21 and R22, as the output of U7C drops.

Terminals 8, 9 and 10 of terminal block 1 are output connections for the alarm relay 18 (K1). During normal operation, relay K1 is constantly pulled in. Should a fault condition develop, or if power is lost, relay K1 will drop out activating the alarm signal. Transistor Q2 is used as a switch to apply power to the coil of relay K1. Resistor R16 sets the base of the transistor current at approximately 2 mA. Diode D9 absorbs the coil discharge current associated with turning Q2 off.

SW2 is a four position DIP switch which provides a means to configure the control electronics for various installations. RP1D is necessitated in this particular configuration, since output P1.5 of the CPU U1 does not have an internal pull-up.

U5B is another retriggerable monostable multivibrator (74HC4538). When the "A" input transitions from a logic LOW to HIGH (positive edge), output "Q" will pulse HIGH for approximately 0.075 seconds, as determined by timing components R13 and C5. "Q" will remain HIGH if "A" continues to receive periodic LOW to HIGH transitions prior to the termination of the output pulse. "Q" drives D3, a green status light emissive diode (LED), which indicates normal operation of the system. Resistor R10 sets the LED's operating current at approximately 3 mA. D3 will always be on during normal conditions and will flash, flicker, or go off for various fault conditions. The ERR output signal from voltage regulator U2 overrides the signal from output P0.7 of the CPU U1 and turn on the LED D3.

The CPU U1 (P87LPC767N) is a microcontroller containing the associated I/O ports that coordinate the operations of all of the components of the system. The CPU U1 also includes a four-channel, eight-bit analog to digital converter. The speed at which the CPU U1 executes instructions is controlled by C13, Y1 and C14.

A nonvolatile memory device U3 (93C46) holds various operating parameters and error conditions which may differ from application to application and from time-to-time. This data must be remembered in the absence of power. Resistor R20 resolves any temporary conflict between the data input (DI) and the data output (DO) pins, which connect to a single I/O pin (P1.3) of the CPU U1. Pull-up resistors RP1A and RP1E are required, since port P1.2 and P1.3 on the CPU are open drain outputs.

VR1 is an analog input to the CPU U1 for establishing a minimum fluid output pressure associated with a low flame or a pilot operating condition in the case of a gas burner type of heating device. A dual operational amplifier U7A and U7B (LM358A) is configured as a differential input, differential output amplifier. It amplifies the low level output signal from the pressure sensor 24 by a factor determined by the gain setting resistors R17, R18 and Rg. Resistors R4 and R5 provide a means to trim the output offset voltage from the pressure sensor. Because the values of Rg, R4 and R5 depend upon the characteristics of the pressure sensor, these components may be located on a separate pressure sensor circuitboard, as illustrated in FIG. 11B. Capacitors C10, C15, C16 and C17 filter out noise signals. Resistor R12 is a pull-up resistor and resistor R14 is a pull-down resistor. These two resistors assist the amplifier outputs in establishing the desired output voltage. The output of the amplifier is fed directly to the analog inputs of the CPU U1. J1 and J2 are power and signal connections for the pressure sensor circuitboard, respectively.

Figure 12A:
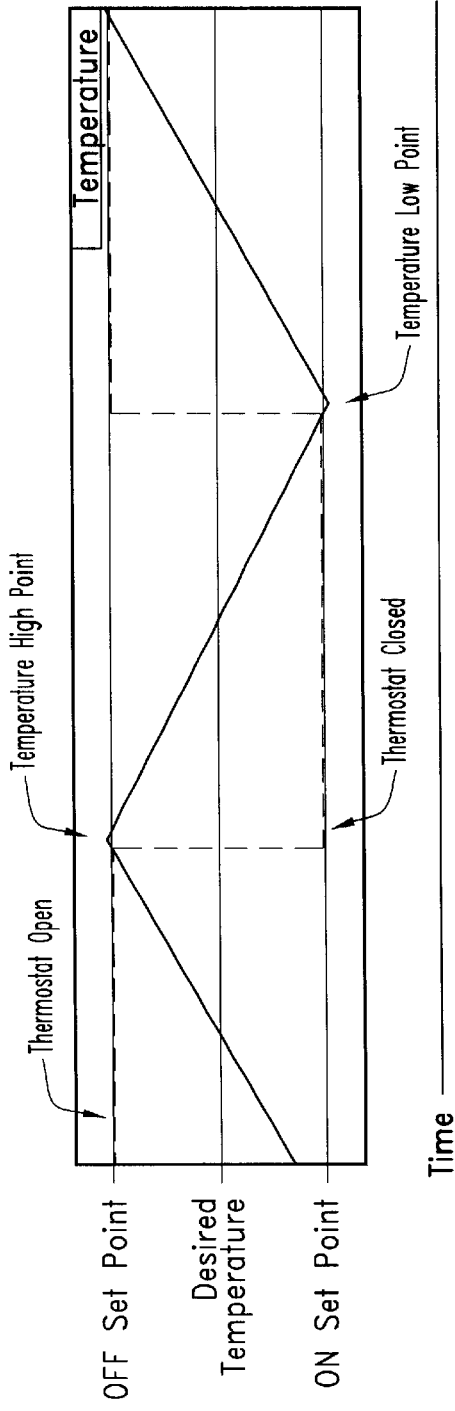
FIG. 12A is a graph of ambient temperature variation versus time for the control system of the present invention.
Figure 12B:
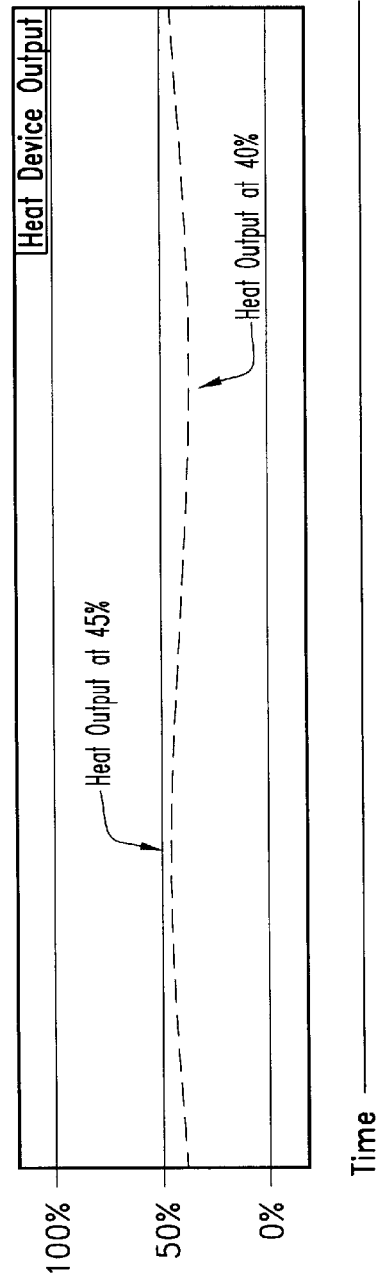
FIG. 12B is a graph of heating device output versus time for the control system of the present invention.

The control system of this invention provides an apparatus for accurately controlling the ambient temperature within a room or an enclosure to a desired temperature minimizing the temperature variations of the ambient temperature, as illustrated in FIGS. 12A and 12B. As seen therein, the output of the heating device 12 is maintained within a narrow range (FIG. 12B), inherently resulting in less ambient temperature fluctuations over time (FIG. 12A).

This provides a distinct advantage over known temperature control systems which inherently cause large fluctuations of the ambient temperature. The system of this invention also has limited moving parts, relying upon electronic operation of the pressure control valve without the necessity of an AC or DC motors. This provides an inherently reliable system with less complexity than the known temperature control systems. The system has dry contact inputs and may be connected to most temperature control devices. The control logic of the instant system minimizes the amount of time from the signal to heat or cool, to the change in the pressure set point and to the resulting change in temperature. The temperature set point can readily be controlled remotely by a remote temperature control device, if desired. This is very convenient when it is necessary to vary the desired ambient temperature, especially in the livestock industry where the ambient temperature set point varies over the age of the animals. The system can be made and sold at low cost and can be used with any number of heating devices.

The foregoing description is provided for illustrative purposes only and should not be construed as in any way limiting this invention, the scope of which is defined solely by the appended claims.

We claim:

1. A control system for establishing and maintaining a desired uniform temperature in a room heated by a heating device, the control system comprising:

a) a valve assembly controlling a fluid supplied to the heating device, the valve assembly including a valve actuator;

b) at least one pressure sensor sensing the pressure of the fluid supplied to the heater;

c) at least one temperature control device which senses the ambient temperature in the room at first predetermined intervals, compares the ambient temperature to at least one predetermined temperature set point and if the ambient temperature differs from the temperature set point by a predetermined amount, issues a control signal;

d) an electronic control unit connected to the at least one temperature control device, the at least one pressure sensor and the valve actuator, the electronic control unit including an electronic circuit which receives the control signal from the temperature control device, determines the rate of change of the pressure of the fluid from a predetermined pressure set point, and varies the pressure set point in accordance with the control signal, thereby varying the heating device output, by providing a command signal to the valve actuator based upon a difference between the at least one predetermined temperature set point and the actual temperature, and the rate of change of the pressure of the fluid.

2. The control system of claim 1 wherein the electric circuit includes: a central processing unit (CPU) connected to the at least one pressure sensor so as to sample a pressure signal from the at least one pressure sensor that is indicative of the pressure of the fluid at second predetermined intervals, the CPU including a comparator to receive the sampled pressure signals and to compare the received pressure signals to a predetermined pressure set point to determine the rate of change of the pressure.

3. The control system of claim 2 wherein the second predetermined intervals for sampling the pressure signals are adjustable.

4. The control system of claim 3 wherein the second predetermined intervals are no greater than 10 seconds.

5. The control system of claim 1 wherein the at least one predetermined temperature set point comprises an upper temperature set point and a lower temperature set point.

6. The control system of claim 1 wherein the first predetermined intervals for sampling the ambient temperature are adjustable.

7. The control system of claim 6 wherein the first predetermined intervals are no greater than 10 minutes.

8. The control system of claim 1 wherein the valve actuator comprises an on/off heat motor.

9. The control system of claim 8 wherein the electronic control unit is connected to the on/off heat motor and further comprises:

a) a power supply portion of the electronic circuit supplying predetermined nominal power to the on/off heat motor; and b) a pulse width modulation register connected to the on/off heat motor so as to apply to the on/off heat motor a series of electrical pulses wherein the widths of the electrical pulses are modulated to control opening and closing of the valve assembly.

* * * * *